US006056339A

United States Patent [19]

Berger

[11] Patent Number: 6,056,339

[45] Date of Patent: May 2, 2000

[54] MAGNETIC RETRIEVING DEVICE

[76] Inventor: Leon M. Berger, 7830 Oak Hill Rd., Hesperia, Calif. 92345

[21] Appl. No.: 09/231,873

[22] Filed: Jan. 14, 1999

[51] Int. Cl.[7] .......... B25J 15/06

[52] U.S. Cl. .......... 294/65.5

[58] Field of Search .......... 294/65.5; 335/285, 335/293, 295, 302, 303; 81/64, 177.6, 487, 488

[56] References Cited

U.S. PATENT DOCUMENTS

| | | | |
|---|---|---|---|
| 512,381 | 1/1894 | Keyes | 294/65.5 |
| 2,285,440 | 6/1942 | Kaiser | 294/65.5 |
| 2,428,864 | 10/1947 | Boyd . | |
| 2,471,764 | 5/1949 | Miller et al. . | |
| 2,599,966 | 6/1952 | Zachary | 294/65.5 |
| 2,828,762 | 4/1958 | Swank | 335/285 |
| 2,834,241 | 5/1958 | Chowning | 294/65.5 |
| 2,932,538 | 4/1960 | Holmes . | |
| 2,976,075 | 3/1961 | Budreck . | |
| 3,384,408 | 5/1968 | Furzey . | |
| 3,789,336 | 1/1974 | Gordin . | |
| 4,813,729 | 3/1989 | Speckhart . | |
| 5,265,887 | 11/1993 | Stelmach | 294/65.5 |
| 5,799,999 | 9/1998 | Schneider et al. . | |

*Primary Examiner*—Dean J. Kramer

*Attorney, Agent, or Firm*—Nixon & Vanderhye PC

[57] ABSTRACT

A magnetic retrieving device, comprising an elongated tubular handle member; a plunger movably mounted within the handle member for movement between an outer position and an inner position; a biasing member disposed within the handle member for urging the plunger toward the outer position thereof; an elongated flexible and resilient cable connected at one end thereof to the inner end of the handle member and at the other end thereof to an elongated tubular shield member; a flexible and resilient wire member extending through the cable and connected at one end thereof to the inner end portion of the plunger and at the other end thereof to the inner end portion of a magnet member movably mounted within the shield member for movement between an inner position wherein it is disposed within the shield member and an outer position wherein it extends outwardly of the outer end of the shield member. The biasing member serves to maintain the plunger in the outer position thereof relative to the handle member and also serves to maintain the magnet member in the inner position thereof relative to the shield member. When it is desired to move the magnet member to the outer position thereof wherein it extends outwardly of the shield member, the plunger is moved to the inner position thereof. This movement of the plunger member is transferred by the wire member to the magnet member to move it to the outer position thereof wherein it can pick up a metal object to be retrieved.

10 Claims, 2 Drawing Sheets

MAGNETIC RETRIEVING DEVICE

BACKGROUND OF THE INVENTION

The present invention relates to a magnetic retrieving device and, more particularly, to such a device which is hand-held and can be easily maneuvered into small areas for picking up parts or tools of magnetic material.

Over the years, the need for a practical magnetic retrieving tool has increased for the reason that more equipment is installed into smaller spaces such that, during periodic maintenance and repair, parts such as nuts or bolts, or tools such as wrenches are dropped into inaccessible areas where it is difficult to retrieve them.

While retrieving tools have been previously proposed and/or used, such tools have involved certain defects and disadvantages which have prevented them from achieving any appreciable degree of commercial success. The defects and disadvantages of prior retrieving tools are as follows:

1. They have been complicated in construction and thus expensive to manufacture;
2. They have been difficult to use;
3. They have lacked sufficient magnetic strength to pick up larger objects such as tools or the like;
4. They have not been small enough to fit into very tight areas;
5. They have clung to surrounding surfaces for the reason that they have not been provided with any means to neutralize the magnetic effect on a selective basis; and/or
6. They have not been sufficiently insulated for use inside electrical enclosures.

The magnetic retrieving tool of the present invention is not subject to any of the above-described defects or disadvantages, and possesses advantages not found in previously proposed or used retrieving tools.

SUMMARY OF THE INVENTION

The magnetic retrieving device of the present invention comprises a plunger that is slidably mounted within a tubular handle member, both of which are formed of a non-magnetic material such as a suitable plastic or the like. Biasing means, such as a spring or the like is provided within the inner end of the handle member for the purpose of urging the plastic plunger in a direction away from the outer end of the handle member so that it is normally spaced therefrom.

The inner end of the plunger is connected to a flexible and resilient wire or the like which extends into and through a flexible and resilient cable that is connected to the inner end of the handle member. The cable may be a vinyl-covered, wire wound coaxial cable or the like. The opposite end of the cable is connected to a tubular magnetic shield member formed of a suitable material such as steel or the like. The opposite end of the wire is secured to a disk formed of steel or the like which is secured to an elongated magnet that is slidably mounted within the shield member.

The biasing means within the handle member, therefore, serves to normally maintain the magnet within the shield member such that the outer end of the magnet is spaced from the outer end of the shield member when the plunger is in an outer position spaced from the outer end of the handle member. In this position, the shield member absorbs the magnetic field and the empty space within the shield member serves to keep the magnetic field within the shield member.

When it is desired to use the retrieving device to retrieve a magnetic object such as a part or tool, the plunger is depressed within the handle member against the force of the biasing means therein to move the magnet by means of the connecting wire to a position wherein it is located outwardly of the shield member for the purpose of engaging and picking up a part or tool to be retrieved.

After the part or tool has been retrieved, the plunger is released to allow the biasing means within the handle member to move the plunger to an outer position and to move the magnet within the shield member so that it is spaced from the outer end thereof. The outer surface of the shield member is covered with a non-magnetic material such as plastic or the like so that the magnetic field is confined within the shield member when the magnet is in an inner position therein.

The retrieving device of the present invention is simple in construction, reliable in operation, easy to use and is constructed to pick up not only magnetic parts such as nuts, bolts or the like, but also magnetic tools, such as wrenches or the like.

DESCRIPTION OF THE PREFERRED EMBODIMENTS

Figure 1:
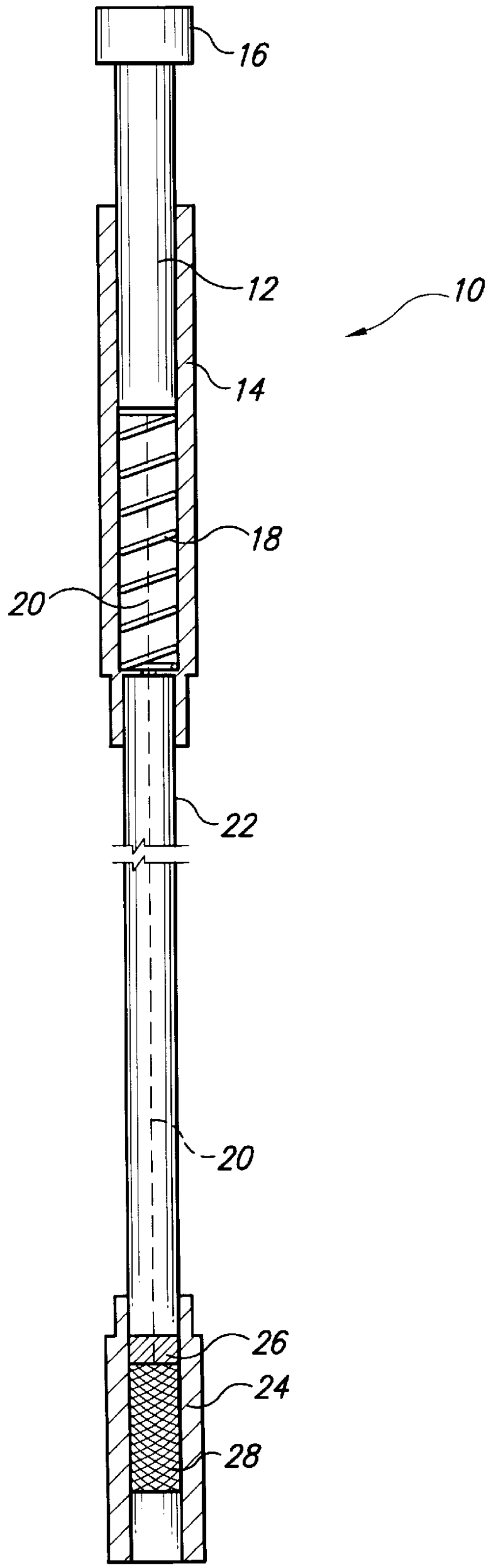
FIG. 1 is an elevational view, partly in section, of the retrieving device of the present invention shown in a normal position wherein the plunger extends outwardly from the handle member and the magnet is retracted within the shield member.
Figure 2:
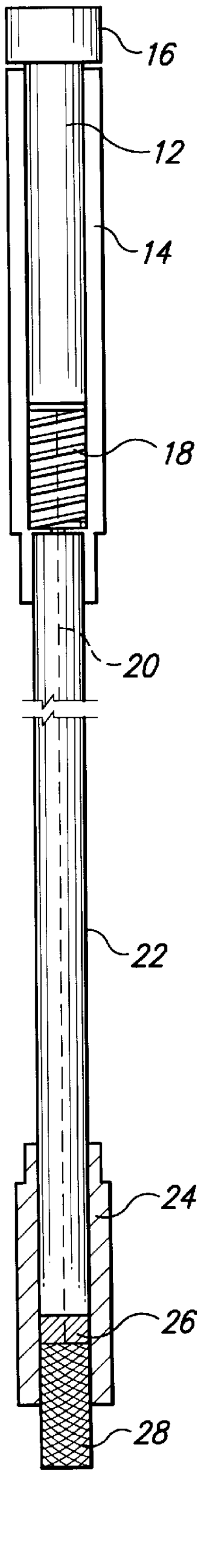
FIG. 2 is an elevational view similar to FIG. 1 showing the plunger in a depressed position wherein it is an inner position within the handle member to extend the magnet outwardly from the lower end of the shield member for the purpose of picking up an object or tool to be retrieved.

Referring to FIG. 1, the magnetic retrieving device 10 of the present invention generally comprises an elongated plunger 12 that is slidably mounted within an elongated tubular handle member 14 for movement between the outer position shown in FIG. 1 and the inner position shown in FIG. 2. The outer end of the plunger 12 is provided with an enlarged end or head portion 16 which can be engaged by the thumb of a user (not shown) grasping the handle member 14 to move the plunger from the outer to the inner position thereof. Suitable biasing means, such as a helical spring 18 is disposed in the inner end of the handle member in engagement with the inner end of the plunger 12 to urge it to the outer position shown in FIG. 1. As shown in FIG. 2, the head portion 16 of the plunger 12 engages the outer end of the handle member 14 to limit the inward movement of the plunger relative to the handle member.

Preferably, the plunger 12 and handle member 14 are formed of non-magnetic materials such as a suitable plastic material. The biasing member or spring 18 may be of any suitable configuration and may be formed of any suitable material.

The inner end of the plunger 12 is connected to one end of a flexible and resilient wire member 20 of any suitable material or configuration. The wire member 20 extends through an elongated flexible and resilient cable 22 of any suitable construction, such as a wire wound coaxial cable that is covered with vinyl or another non-magnetic material. One end of the flexible cable 22 is connected to the adjacent inner end of the handle member 14 in any suitable manner, and the opposite end of the cable 22 is connected in any suitable manner to the adjacent inner end of a tubular shield member which is preferably formed of steel or another material of sufficient thickness to absorb a magnetic field.

The opposite end of the wire member 20 is connected to a disk member 26 or the like formed of steel or another suitable material. The disk member 26 is connected to the adjacent or inner end of an elongated magnet member 28 that is slidably mounted within the shield member 24. Preferably, the magnet member 28 is formed of a material that provides a strong magnetic force, such as a rare earth-iron-boron permanent magnet sold under the trade name NEOMAX-46 by Sumitoms Special Metals America.

FIG. 1 illustrates the magnetic retrieving device 10 of the present invention in an inoperative position wherein the plunger 12 is biased to an outer position by the biasing member or spring 18 and the magnet member 28 is located within the shield member 24 and is spaced from the outer end thereof. Any suitable stop means (not shown) may be provided on the plunger 12, handle member 14, magnet member 28, disk member 26 and/or shield member 24 to limit the outer movement of the plunger relative to the handle member. In this position, substantially all of the magnetic field created by the magnet member 28 is confined within the shield member 24.

FIG. 2 illustrates the magnetic retrieving device 10 of the present invention in an operative position wherein the plunger 12 has been moved inwardly within the handle member 14 to a position wherein its head portion 16 engages the outer end of the handle member and the magnet member 28 is moved beyond the outer end of the shield member 24 in which position the magnetic field created thereby serves to enable the magnet member to pick up a magnetic article to be retrieved, such as a nut, bolt, tool or the like. The length of the magnet member 28 that is extended outwardly of the shield member 24 in the operative position of the retrieving device 10 depends on the type and size of magnet member 28 and also on the size and weight of the magnetic article to be retrieved.

As an illustrative example and not by way of limitation, a NEOMAX-46 magnet member 28 may be of approximately 0.25 inches in diameter and 0.70 inches long. The shield member 24 may be approximately ⅜ of an inch in outer diameter with a thickness of approximately 1/16 of an inch. In tests of a retrieving device of this construction, the device was able to pick up and lift a magnetic article of two and one-half pounds when approximately one-half of the length of the magnet member was extended outwardly of the shield member 24. In this example, the disk member 26 and shield member 24 were formed of steel.

From the foregoing description, it will be readily seen that the magnetic retrieving device 10 of the present invention is simple in construction, easy to operate and is constructed to pick up and retrieve both small and large magnetic articles in small spaces.

What is claimed is:

1. A magnetic retrieving device, comprising:

an elongated tubular handle member;

a plunger movably mounted within said handle member for movement between an outer position wherein its outer end portion is spaced from the outer end of said handle member and an inner position wherein its outer end portion is in engagement with the outer end of said handle member;

a biasing member disposed within said handle member and in engagement with the inner end portion of said plunger to urge it toward said outer portion;

an elongated flexible and resilient cable connected at one end thereof to the inner end of said handle member;

an elongated tubular shield member connected at its inner end to the other end of said flexible cable;

a flexible and resilient wire member extending through said cable and connected at one end thereof to the inner end portion of said plunger;

an elongated magnet member movably mounted within said shield member for movement between an inner position wherein it is disposed within said shield member and an outer position wherein it extends outwardly of the outer end of said shield member, the inner end portion of said magnet member being operatively connected to the other end of said wire member such that movement of said plunger within said handle member is transferred by said wire member to said magnet member to effect corresponding movement thereof within said shield member;

whereby said plunger and said magnet member are normally disposed in said outer and inner positions thereof, respectively, by the force of said biasing member, and movement of said plunger to said inner position thereof causes movement of said magnet member to said outer position thereof;

the other end of said wire member being connected to a metal disk member which in turn is connected to said magnet member.

2. The magnetic retrieving device of claim 1 wherein said plunger has an enlarged outer end portion.

3. The magnetic retrieving device of claim 1 wherein said handle member and said plunger are formed of non-magnetic material.

4. The magnetic retrieving device of claim 3 wherein said handle member and said plunger are formed of plastic material.

5. The magnetic retrieving device of claim 1 wherein said biasing member is an elongated helical spring.

6. The magnetic retrieving device of claim 1 wherein said flexible cable is a vinyl covered wire wound coaxial cable.

7. The magnetic retrieving device of claim 1 wherein said disk member and said shield member are formed of steel.

8. The magnetic retrieving device of claim 1 wherein said magnet member is a rare earth-iron-boron permanent magnet.

9. The magnetic retrieving device of claim 1 wherein, when said magnet member is disposed in said inner position, it is spaced from the ends of said shield member such that its magnetic field is maintained substantially within said shield member.

10. The magnetic retrieving device of claim 9 wherein, when said magnet member is in said outer position thereof, approximately half of the length of said magnet member is disposed outwardly of said shield member.

* * * * *